3,227,641
POLYCARBONYLS
Howard E. Worne, Cherry Hill, N.J., assignor, by mesne assignments, to Natick Chemical Industries, Inc., Framingham Center, Mass., a corporation of Massachusetts
No Drawing. Filed Oct. 5, 1962, Ser. No. 228,734
4 Claims. (Cl. 204—158)

This invention relates to polymerized, cyclic polycarbonyls. It more particularly relates to the dimerized and trimerized forms of cyclohexanehexone, and further to the processes for preparing them.

The compound cyclohexanehexone, a cyclic polycarbonyl having the formula $C_6O_6$ and the structure:

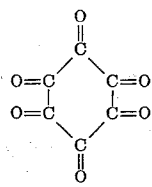

has been known since about 1885. The processes for producing this compound have been relatively inefficient, however, having yields no greater than about 10%. Generally, these prior art processes require the trimerization of glyoxal, producing hexahydroxybenzene, and subsequent oxidation with standard oxidation reagents ($HNO_3$, dichromates, permanganates, etc.) to the final product, cyclohexanehexone. The following illustrates the probable sequence of events:

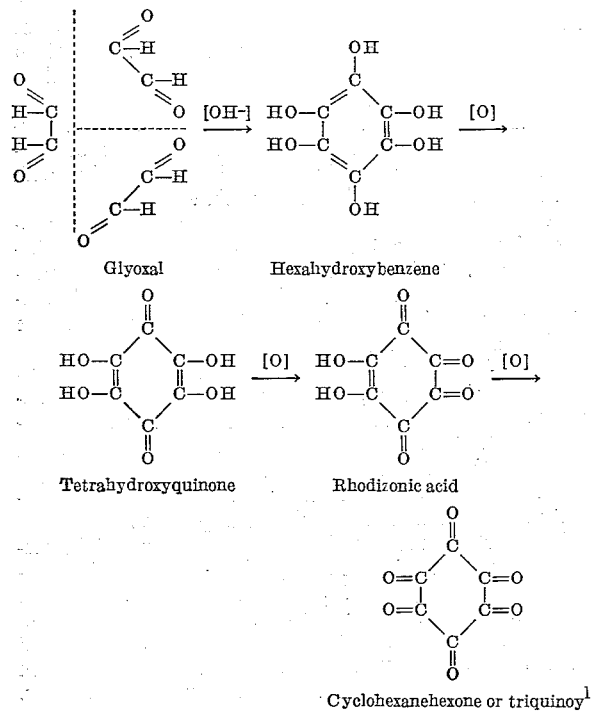

Polymerized forms of cyclohexanehexone have been unknown to the art. The same may also be said of processes yielding such polymerized forms. The prior art may therefore be described as providing relatively inefficient methods for the production of substantially pure cyclohexanehexone, and providing no information with respect to polymerized products thereof nor of methods for making them.

It is a purpose of this invention therefore to provide new and useful polymerized compounds having a cyclic polycarbonyl structure with cyclohexanehexone as the monomer. More particularly, dimerized and trimerized forms of cyclohexanehexone are provided in this invention.

Moreover, it is another purpose of this invention to provide methods for producing dimers and trimers of cyclohexanehexone. Means have also been discovered for increasing the yield of products intermediate to the production of cyclohexanehexone; hence, this invention thus provides additional methods for the production of cyclohexanehexone which, in turn, provides more efficient and inexpensive processes for producing still greater quantities of cyclic polycarbonyls.

It is another purpose of this invention to provide novel compounds and mixtures which have bactericidal, fungicidal and viricidal action.

These and other purposes and objects of this invention are accomplished by providing two novel and useful compounds, the dimer of cyclohexanehexone, $C_{10}O_8$, probably having the structure:

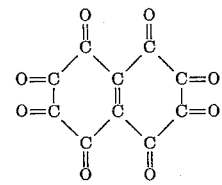

and the trimer of cyclohexanehexone, $C_{14}O_{10}$, probably having the structure:

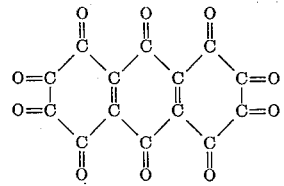

Mixtures of either of these compounds in any proportion will also effectuate the purposes of this invention.

The dimer and trimer and mixtures thereof are water soluble. Higher polymerization products may also be formed by the processes described below, but they are water insoluble and do not have useful bactericidal, fungicidal and viricidal properties.

The purposes of this invention are also effected by processes for producing the above novel compounds, which entail the subjecting of substantially pure, monomeric cyclohexanehexone, preferably in aqueous solution, to ultra-violet radiation for a limited time. Other objects of this invention are attained by employing ozone as the oxidizing agent in the processes for producing cyclohexanehexone. By this means, increased yields of cyclohexanehexone and the dimers and trimers thereof, are obtained.

According to the present invention, the dimer and trimer of cyclohexanehexone may be produced by the following procedures: a quantity of substantially pure cyclohexanehexone is recrystallized from a weak solution of $HNO_3$. A solution of the monomer in triply distilled water is prepared, the concentration of the cyclohexanehexone being about from 1% to 20% by weight, and preferably from about 1% to 5% by weight; but the initial concentration of cyclohexanehexone should not, however, be regarded as a critical parameter. The solution is heated gently under reflux until condensate begins to return to the solution, at which time the solution is irradiated with ultraviolet rays for a period of time the length of which will vary according to the wave length of the ultraviolet radiation. The wave lengths efficacious in the process of tihs invention may vary from about 2200 A.

to about 3200 A. and exposure time will vary directly from about 2 to about 60 minutes. This process is advantageously carried out with a standard mercury ultraviolet lamp having a wave length of 2537 A.; the exposure time with this lamp is preferably from about 5 to 30 minutes.

At the end of the irradiation period, the ultraviolet source is turned off and heating is continued until a trace of precipitate begins to form in the otherwise clear solution. Phosphoric acid is then added; and the solution is rapidly cooled to a temperature somewhat above its freezing point by employing an ordinary ice bath. The trace of precipitate is a polymerized form of cyclohexanehexone, greater in molecular weight than the trimerized form. The addition of phosphoric acid and the rapid cooling inhibits further polymerization. Sulfuric acid is another useful inhibiting agent; but halogenic acids are not useful for this purpose, however, since the halogen readily adds to the carbonyl group, a result which must be avoided.

The cooled solution is filtered through an acid washed filter paper and the clear filtrate, containing the dimerized and trimerized forms of cyclohexanehexone is stored preferably at about 5° C. until ready for use.

In the above process, the irradiation step initiates and catalyzes the polymerization reaction, and the subsequent application of heat continues the same. The following specific example indicates one procedure which may be followed to produce a quantity of the mixture of dimer and trimer. The example should not be construed as limiting the scope of the invention as defined in the appending claims.

EXAMPLE I

A 3 liter flask is fitted with a stirrer, an efficient, reflux condenser and a mercury vapor ultraviolet lamp in the form of a U-tube capable of generating strong waves of 2537 A. wave length. Into the flask is placed 1.2 grams of cyclohexanehexone hydrate, freshly recrystallized from 0.1 N $HNO_3$ and 999 grams of triply distilled water. The mixture is heated under reflux, carefully avoiding spot heat, and with the first return of condensate from the condenser, the ultraviolet tube is turned on for 10 minutes. The tube is then turned off and gentle heating is continued until a trace of precipitate begins to appear in the clear solution. The heat is removed, phosphoric acid is added to a pH of 5.5 and the solution is rapidly cooled to about 5° C. in an ice bath. The solution is filtered through an acid washed filter paper and the filtrate is stored at 5° C. for future use.

Analysis of the filtrate prepared according to the above example revealed the presence of two primary compounds: $C_{10}O_8$ and $C_{14}O_{10}$, the former containing 8 carbonyl groups and the latter 10 carbonyl groups. Between 79% and 90% by weight of the former polymers contained 10 carbonyl groups.

In an effort to increase the yield of the dimer and trimer of cyclohexanehexone, it was regarded as necessary to discover a means for improving the prior art processes for producing monomeric cyclohexanehexone from glyoxal. It was found that the use of ozone as an oxidation agent during the formation of the aromatic ring; i.e. during the trimerization of glyoxal, increased the yield from about 8% to 35% or 40%. According to the present invention, the following process effects this beneficial result: 2 mols of $NaHSO_3$ and 1 mol of $NaHCO_3$ are dissolved in one liter of water. One mol of glyoxal is then added and air containing approximately 1% $O_3$ is bubbled through the solution until the greenish-black crystals of the disodium salt of tetrahydroxyquinone cease to separate out. The crystals are thereupon filtered and acidified with $H_2SO_4$, producing tetrahydroxyquinone. This substance is filtered and washed.

Cyclohexanehexone is prepared from tetrahydroxyquinone by preparing a solution of the latter substance and oxidizing it by means of conventional oxidation agents. The polymerized products are then produced as described earlier, by using the washed and substantially pure cyclohexanehexone produced in increased yields by the procedure just described.

The following example will illustrate one method of the present invention for preparing cyclohexanehexone with yields greater than those heretofore obtainable.

EXAMPLE II

A two liter flask is equipped with a stirrer, an efficient reflux condenser and a gas inlet tube extending to the bottom of the flask. The end of the gas tube within the flask is provided with a small bulb having many fine perforations for the purpose of breaking up the gas stream which passes through the tube. One liter of distilled water is then placed in the flask, and 208.14 grams of $NaHSO_3$ and 84.02 grams of $NaHCO_3$ are dissolved therein. The stirrer is started and 175 grams of a 30% solution of glyoxal is added.

Air containing about 1% $O_3$ by volume is passed through the solution at a rapid rate until greenish black crystals of the disodium salt of tetrahydroxyquinone cease separating therefrom.

The contents of the flask are filtered with suction and the tetrahydroxyquinone salt is resuspended in 500 cc. of distilled water. The suspension is acidified with $H_2SO_4$ to form tetrahydroxyquinone, which is filtered with suction and washed with 50 cc. portions of ice water until the washings are free of $H_2SO_4$. The tetrahydroxyquinone is dissolved in 300 cc. of boiling water and filtered while hot. The filtrate is placed in an ice chest for 24 hours, the black crystals of tetrahydroxyquinone separating out.

The preparation of cyclohexanehexone from tetrahydroxyquinone is made according to the following illustrative process: In a 4 liter beaker, 172 grams of tetrahydroxyquinone and 0.5 gram of $V_2O_5$ are dissolved in 2 liters of distilled water. The water is heated to 75° C. and after the solid is completely dissolved, the solution is cooled to 20° C., whereupon a mixture consisting of 200 grams of $HNO_3$ and 400 grams of concentrated $H_2SO_4$ is slowly poured into the beaker with stirring. The solution is cooled again to 20° C.

A concentrated solution of sodium dichromate is prepared by dissolving 540 grams thereof in 260 cc. of distilled water. This solution is slowly added to the tetrahydroxyquinone solution and the resulting mixture is constantly stirred with a mechanical stirrer. The temperature of the quinone solution must not rise above 30° C., hence a means for cooling is provided. It is also necessary to use an efficient stirrer, because the quinone solution becomes thick during the addition of the dichromate oxidation agent. The stirrer must agitate the entire mixture, including the bottom and sides of the beaker. Improper stirring results in a black, sticky precipitate which is difficult to separate from the desired end product.

The dark solution gradually turns yellow and its viscosity decreases. When the yellow color remains permanently, the reaction is complete and stirring may be stopped. The oxidation reaction takes about 1 to 1½ hours. The mixture is then cooled to 5° C. and filtered with suction. As much water as possible is pressed from the crystals. The filtrate is extracted with two 300 cc. portions of cyclohexane. The precipitate of crude cyclohexanehexone is dissolved in 750 cc. of cyclohexane and the total amount of the 600 cc. portion of cyclohexane used to extract the filtrate is added to it.

The mixture is heated on a steam bath to dissolve the crude cyclohexanehexone. 10 grams of anhydrous $CaCl_2$ is added with stirring and the resulting solution filtered into a 3 liter distilling flask before cooling. The distilling flask is then attached to a condenser set for downward distillation and the cyclohexane is distilled off. When the cyclohexanehexone starts to separate, the residue in the flask is transferred to a beaker and cooled in an ice bath. The precipitate is filtered with suction and then redissolved in 1 liter of a 1% solution of hot $HNO_3$. The beaker is set in an ice chest for 24 hours and the colorless needles of cyclohexanehexone which separate out are filtered with suction, washed with two 50 cc. portions of ice water and then dried in a vacuum oven at 50° C., under a pressure of 10 mm.

The crystals of cyclohexanehexone obtained by a procedure similar to the one in Example II weighed 197.2 grams. Further working up of the mother liquor resulted in a yield increased by about 3 to 4 grams. This substantially pure product may be used in the processes described earlier for the production of the dimer and trimer of cyclohexanehexone.

The dimer and trimer of cyclohexanehexone exhibit the germicidal activity evidenced in the following table.

Table I

Highest dilution of a mixture of polymerized cyclohexanehexone (a 90:10 mixture by weight of trimer to dimer) which kill micro-organisms after ten minutes but not five minutes at 37° C.:

| Organism | FDA | Shippens modification |
| --- | --- | --- |
| Staphylococcus aureus (PCI-1203) | 1:132,000 | 1:114,000 |
| Streptococcus pyogenes (PCI-134) | 1:110,000 | 1:102,000 |
| Streptococcus faecalis (PCI-1341) | 1:125,000 | 1:112,000 |
| Escherichia coli (PCI-540) | 1:108,000 | 1:93,000 |
| Shigella sonei (11060) | 1:117,000 | 1:101,000 |
| Bacillus subtilis (12432) | 1:88,000 | 1:69,000 |
| Klebsiella pneumoniae (PCI-692) | 1:251,000 | 1:194,000 |
| Proteus vulgaris (7829) | 1:196,000 | 1:173,000 |
| Bordetella bronchiseptica (PCI-170/01) | 1:112,000 | 1:107,000 |
| Mucobacterium phlei (356) | 1:60,000 | 1:52,000 |
| Mycobacterium smegmatis (362) | 1:93,000 | 1:80,000 |
| Salmonella typhosa (6539) | 1:100,000 | 1:89,000 |
| Salmonella choleraesuis (10708) | 1:118,000 | 1:96,000 |
| Micrococcus flavus (PCI-1216) | 1:94,000 | 1:71,000 |
| Sarcina lutea (PCI-1001) | 1:90,000 | 1:78,000 |
| Neisseria gonorrhoeae (10874) | 1:245,000 | 1:222,000 |

The control in each of the above exhibited no gemicidal activity.

I claim:

1. The process for producing polymerized polycarbonyl compounds comprising subjecting an aqueous solution of substantially pure cyclohexanehexone to ultraviolet radiation for a period of from about 5 to about 60 minutes, heating said solution until a first trace of precipitate appears, adding an agent to said solution for the purpose of inhibiting further polymerization of said cyclohexanehexone, said agent selected from the group consisting of phosphoric acid and sulfuric acid, and cooling said solution to a temperature slightly above the freezing point thereof.

2. The process for producing polymerized polycarbonyl compounds comprising heating under reflux an aqueous solution of substantially pure cyclohexanehexone, when condensate begins to return to said solution subjecting said solution for a period from about 5 to about 60 minutes to ultraviolet radiation, said ultraviolet radiation having a wave length of from about 2200 A. to 3200 A., heating said irradiated solution until a first trace of precipitate appears therein, adding an agent to said solution to inhibit further polymerization of said cyclohexanehexone, said agent selected from the group consisting of phosphoric acid and sulfuric acid, and cooling said solution to a temperature slightly above the freezing point thereof.

3. The process for producing polymerized polycarbonyl compounds comprising heating under reflux an aqueous solution of substantially pure cyclohexanehexone, when condensate begins to return to said solution subjecting said solution for a period of from about 5 to 10 minutes to ultraviolet radiation, said ultraviolet radiation having a wave length of 2537 A., heating said irradiated solution until a first trace of precipitate appears therein, adding an agent to said solution to inhibit further polymerization of said cyclohexanehexone, said agent selected from the group consisting of phosphoric acid and sulfuric acid, and cooling said solution to a temperature slightly above the freezing point thereof.

4. The product formed by the process as defined in claim 1.

References Cited by the Examiner

Bergel: Ber. Deut. Chem., vol. 62, pp. 490–1 (1929).

Eistert et al.: Ber. Deut. Chem., vol. 92, pp. 1239–46 (1959).

Homolka: Ber. Deut. Chem., vol. 54, pp. 1393–6 (1921).

LEON ZITVER, *Primary Examiner.*

LORRAINE A. WEINBERGER, *Examiner.*